(Model.)
D. MORRIS.
LOCK.
No. 294,901. Patented Mar. 11, 1884.
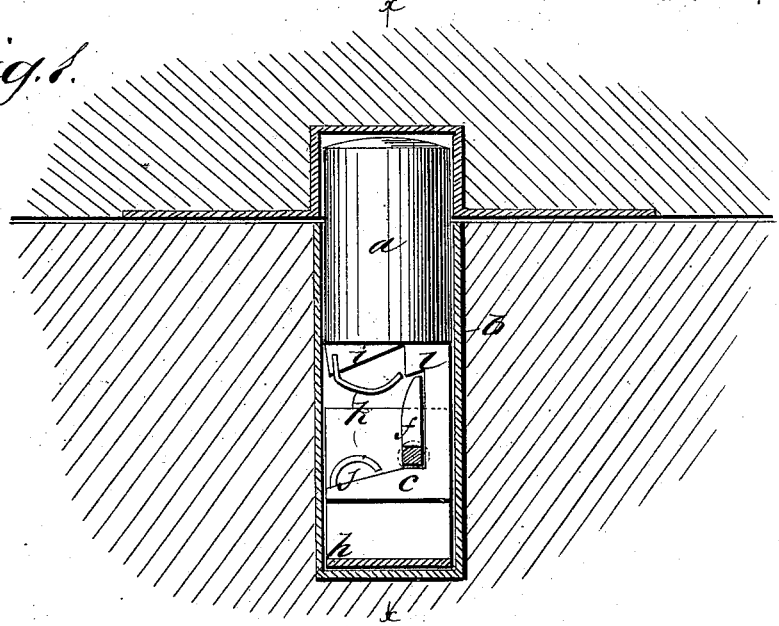
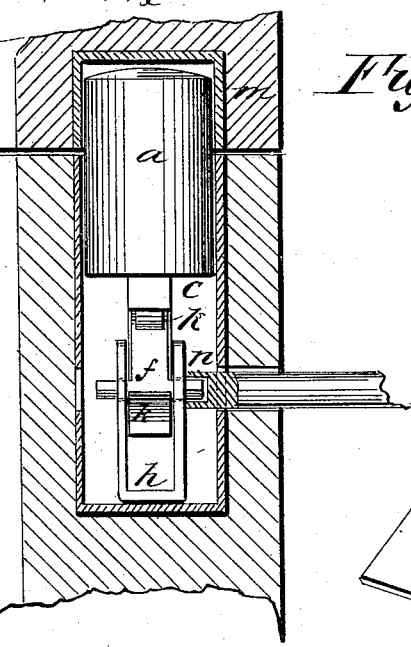
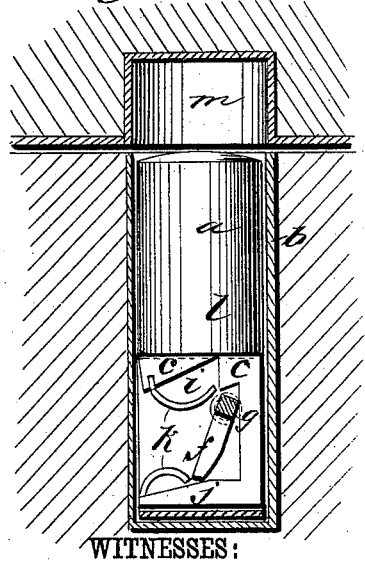
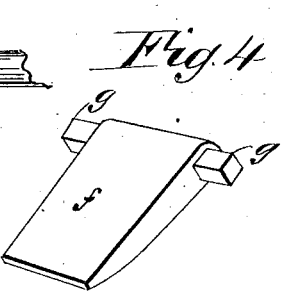
WITNESSES:
Francis McArdle
C. Sedgwick
INVENTOR:
D. Morris
BY Munn & Co
ATTORNEYS.

UNITED STATES PATENT OFFICE.

DAVID MORRIS, OF LOG CABIN, OHIO, ASSIGNOR TO HIMSELF AND NEHEMIAH WRIGHT, OF SAME PLACE.

LOCK.

SPECIFICATION forming part of Letters Patent No. 294,901, dated March 11, 1884.

Application filed August 20, 1883. (Model.)

*To all whom it may concern:*

Be it known that I, DAVID MORRIS, of Log Cabin, in the county of Morgan and State of Ohio, have invented a new and Improved Lock, of which the following is a full, clear, and exact description.

The object of the invention is to improve that class of locks in which a slide-bolt is moved in either direction by a wiper, as hereinafter described.

Reference is to be had to the accompanying drawings, forming part of this specification, in which similar letters of reference indicate corresponding parts in all the figures.

Figure 1 is a sectional elevation of the case of the lock and part of the mechanism, showing the bolt in side elevation and thrust forward into the catch. Fig. 2 is a similar section of the lock, taken in a plane at right angles to that of Fig. 1. It also represents a portion of the key. Fig. 3 is a section in the same plane as Fig. 1, the bolt being drawn back or down out of the catch; and Fig. 4 is a perspective view of the wiper employed for throwing the bolt by the key, also for locking the bolt.

The bolt $a$ is preferably a plain cylindrical rod for most of its length, and is fitted to a case, $b$, of similar form and proper size to receive the bolt, this form being preferred because of being the simplest to construct, and also to fit in the door or other object to which the lock is to be applied; but I may of course construct the bolt and case in any other form of cross-section.

Inside of the case, and preferably at the inner end of the bolt, and for a suitable distance therefrom along the bolt, I cut away the sides of the bolt, or otherwise construct the bolt to form the flat section $c$, in which I make a deep and wide notch, $e$, wherein the wiper $f$ works to throw and lock the bolt, said wiper being provided with the pivot and key studs $g$, by which it is mounted on the wiper-stand $h$ for support, said stand consisting of a base, by which it is attached to the inner end of the lock-case, and two upright or horizontal arms, (according as the lock may be placed,) in which the pivot-studs are supported with the wiper between them, and the part $c$ of the bolt is also arranged between said arms. The pivot-studs of the wiper $f$ project from the opposite edges of the wiper, near one end, and this end of the wiper is arranged in the bottom of the notch $e$ of the bolt, so that the wiper swings along the top or open side of the notch, between the ends $i$ and $j$ of said notch. At each end of the notch there is a spring, $k$, against which the wiper acts to throw the bolt, the springs being to rise a little after the wiper passes and prevent it from being jarred out of its position, or turned out by any instrument except the key. There is an undercut ledge, $l$, in the end $i$ of the notch, where the wiper rests when the bolt is shifted forward into the catch $m$, in which the wiper is returned by the incline of the ledges and by the gravity of the wiper, so that it effectually resists the opening of the lock by forcing the bolt back. The ends of the pivot-studs $g$ are squared for a socket-key, $n$, to be used for turning the wiper, the socket being formed in the end of a small rod, which makes a smaller and simpler device to carry in the pocket than the ordinary door-keys.

The form of bolt and case which may be used in this improved lock enables the bolt to be fitted nicely to the case throughout its whole length, and to be firmly supported thereby, which is a more permanent and better working arrangement than is afforded by clips, guides, and other attachments to the interior of the case for the support of the bolt.

Having thus described my invention, what I claim as new, and desire to secure by Letters Patent, is—

1. The combination, with the bolt $a$ and case $b$, constructed to fit each other for guiding and supporting the bolt by the case only, of the wiper-stand $h$, embracing the section $c$ of the bolt, having less thickness than the rest of the bolt, and the wiper $f$, supported in said stand and working in the notch $e$ of the said section $c$ of the bolt, substantially as described.

2. The combination, with the bolt $a$, having notched section $c$ and undercut ledge $l$, of the wiper $f$ and a spring, $k$, said spring being arranged to retain the wiper under or in contact with the said ledge, substantially as described.

3. The combination of notched section $c$ of the bolt $a$, wiper $f$, and a spring, $k$, at each end of the notch, to retain the wiper in its positions, substantially as described.

DAVID MORRIS.

Witnesses:
H. J. BEARD,
CHARLES W. MATHEWS.